United States Patent
Le

(12) 
(10) Patent No.: US 6,681,907 B2
(45) Date of Patent: Jan. 27, 2004

(54) ENERGY ABSORBING ASSEMBLY

(76) Inventor: Tony Le, 3544 Gertrude, Dearborn, MI (US) 48124

( * ) Notice: Subject to any disclaimer, the term of this patent is extended or adjusted under 35 U.S.C. 154(b) by 0 days.

(21) Appl. No.: 10/163,810

(22) Filed: Jun. 6, 2002

(65) Prior Publication Data

US 2002/0185795 A1 Dec. 12, 2002

Related U.S. Application Data

(60) Provisional application No. 60/296,649, filed on Jun. 7, 2001.

(51) Int. Cl.[7] ............................ B60R 19/02; B60R 19/18
(52) U.S. Cl. ........................ 188/371; 188/377; 293/133
(58) Field of Search ................................ 188/371, 376, 188/377, 372; 293/102, 133, 146; 296/146.6; 280/751, 752; 267/141, 141.2, 141.6, 141.7

(56) References Cited

U.S. PATENT DOCUMENTS

| | | | |
|---|---|---|---|
| 3,077,355 A | | 2/1963 | Santesso et al. ............ 280/150 |
| 3,599,757 A | * | 8/1971 | Takamatsu .................. 188/371 |
| 3,933,387 A | | 1/1976 | Salloum et al. |
| 3,938,841 A | | 2/1976 | Glance et al. ................ 293/71 |
| 4,022,505 A | | 5/1977 | Saczawa, Jr. |
| 4,029,350 A | | 6/1977 | Goupy et al. |
| 4,050,726 A | * | 9/1977 | Hablitzel ..................... 293/98 |
| 4,631,221 A | | 12/1986 | Disselbeck et al. |
| 4,969,680 A | | 11/1990 | Shimoda |
| 5,030,501 A | | 7/1991 | Colvin et al. |
| 5,098,124 A | | 3/1992 | Breed et al. ................. 280/751 |
| 5,282,288 A | | 2/1994 | Henson |
| 5,306,066 A | | 4/1994 | Saathoff ................... 296/146.6 |
| 5,356,177 A | | 10/1994 | Weller ......................... 280/751 |
| 5,370,417 A | | 12/1994 | Kelman et al. ............. 280/751 |
| 5,382,051 A | | 1/1995 | Glance |
| 5,399,406 A | | 3/1995 | Matsuo et al. |
| 5,445,430 A | | 8/1995 | Nichols ...................... 296/153 |
| 5,493,791 A | | 2/1996 | Kramer |
| 5,518,802 A | | 5/1996 | Colvin et al. |
| 5,531,499 A | * | 7/1996 | Vecchio et al. .......... 296/146.7 |
| 5,549,327 A | | 8/1996 | Rüsche et al. .............. 280/751 |
| 5,566,777 A | * | 10/1996 | Trommer et al. ........... 180/232 |
| 5,632,507 A | | 5/1997 | Sinner et al. ............... 280/751 |
| 5,700,545 A | | 12/1997 | Audi et al. .................. 428/131 |
| 5,731,062 A | | 3/1998 | Kim et al. |
| 5,762,392 A | | 6/1998 | Suga .......................... 296/39.1 |
| 5,823,611 A | | 10/1998 | Daniel et al. ................ 296/214 |
| 5,836,641 A | | 11/1998 | Sugamoto et al. .......... 296/189 |
| 5,972,477 A | | 10/1999 | Kim et al. |
| 6,017,084 A | | 1/2000 | Carroll, III et al. ......... 296/189 |
| 6,036,227 A | | 3/2000 | Lin et al. .................... 280/751 |
| 6,186,582 B1 | | 2/2001 | Beckmann ................... 296/189 |

(List continued on next page.)

FOREIGN PATENT DOCUMENTS

| | | |
|---|---|---|
| EP | 56131849 | 10/1981 |
| EP | 0863056 A1 | 9/1998 |
| EP | 1187145 A1 | 3/2002 |
| GB | 2331492 A | 5/1999 |
| GB | 2345737 A | 7/2000 |
| JP | 56131849 | * 10/1981 |
| WO | WO 00/01525 | 1/2000 |

*Primary Examiner*—Matthew C. Graham
(74) *Attorney, Agent, or Firm*—Howard & Howard

(57) ABSTRACT

An energy absorbing module 10 including a plurality of cells 12, 112 with each cell 12, 112 including a first step wall 22 and 122 horizontally interconnecting first 16, 116 and second 18, 118 walls and having a greater thickness than the second wall 18, 118 for assuring collapse of the second wall 18, 118 before collapse the first wall 16, 116 in response to a force applied to the second wall 18, 118. Likewise, a second step wall 24 and 124 horizontally interconnects the second wall 18, 118 and a third wall 20, 120 and has a greater thickness than the first step wall 22 and 122 for assuring collapse of the third wall 20, 120 before collapse of the second wall 18, 118 in response to a force applied to the third wall 20, 120.

10 Claims, 2 Drawing Sheets

U.S. PATENT DOCUMENTS

| | | |
|---|---|---|
| 6,199,942 B1 | 3/2001 | Carroll, III et al. |
| 6,221,292 B1 | 4/2001 | Carroll, III ................. 264/122 |
| 6,221,930 B1 | 4/2001 | Tada et al. .................. 521/155 |
| 6,234,526 B1 | 5/2001 | Song et al. ................. 280/751 |
| 6,247,745 B1 | 6/2001 | Carroll, III et al. |
| 6,435,579 B1 | 8/2002 | Glance |
| 6,443,513 B1 | 9/2002 | Glance |

\* cited by examiner

ENERGY ABSORBING ASSEMBLY

RELATED APPLICATION

The subject application claims the benefit of co-pending provisional application Serial No. 60/296,649 filed Jun. 7, 2001.

BACKGROUND OF THE INVENTION

1. Field of the Invention

The subject invention relates to an impact energy-absorbing module for dissipating energy during impact of an object.

2. Description of the Prior Art

Many products are vulnerable to injurious forces resulting from an impact, e.g., vehicles, helmets, and the like. These products-must be able to absorb a significant percentage of the energy from an impact. In the past, this has been accomplished by providing the assembly with an energy-absorbing device for supporting deformation of the assembly in order to absorb the energy from the impact.

Within the vehicle, for example, occupants require protection from an impact with structural body components such as door pillars, frames and headrails. These components are typically made of steel tubing or steel channels which are welded together to form the structural cage or unitized body for the vehicle, and may themselves become deformed as a result of the impact. Energy absorbers have been placed over the door pillars, frames, headrails and other parts of the vehicle behind interior trim to protect the vehicle occupants. Prior art approaches have used energy absorbing urethanes, polystyrene, rigid polymeric foams, blocks or cells or vanes of engineered plastics, and various sheet metal configurations, metal beams, honeycombed metal, and other geometric solids for absorbing energy. These devices, however, generally absorb less than the desired amount of energy for a given displacement, and have often produced inconsistent results.

U.S. Pat. No. 5,549,327 discloses an energy impact absorber having a stepped wall encircling a central axis. Each of the stepped walls yields an equivalent sheering force as does the next stepped wall, regardless of the thickness of the wall. A significant amount of the energy absorption is lost when a wall sheers. If the stepped wall does not sheer, energy will continue to be transferred throughout the energy absorber to walls that have not yet been deformed.

Therefore, a need exists for an energy absorbing device which maximizes energy absorption, and provides repeatable energy absorbing results. Additionally, the energy-absorbing device should have the ability to consistently dissipate a wide range of energy thresholds.

SUMMARY OF THE INVENTION AND ADVANTAGES

The subject invention provides an energy absorption module including at least one cell having a first wall extending upwardly along and encircling an axis, a second wall extending about the axis within and closer to the axis than the first wall. The cell is characterized by including a first step wall horizontally interconnecting the first and second walls and having a greater thickness than the second wall for assuring collapse of the second wall before the collapse of the first wall in response to a force applied to the second wall.

The invention also includes a method of molding the module by injection of an organic polymeric material into a cavity formed in mold parts to define the novel configuration of the cell.

Because the first step wall includes a thickness greater than that of the first and second walls the deformation of the cell when subjected to an impact force can be controlled. The increased thickness of the step wall prevents the first wall from shearing from the second wall during the impact. Thus, amount of energy absorption provided by each cell can be increased, and predetermined by the thickness of the step wall.

The energy-absorbing device of the subject invention optimizes the amount of energy absorption by utilizing the cells having the connecting steps of varying thicknesses. Additionally, each cell allows the subject invention to absorb a wide range of energy thresholds and produce repeatable energy dissipation results. The amount of energy absorbed by each cell can be precisely determined due to the introduction of various numbers and dimensions of the cells because the exact location and amount of the energy absorption may be determined.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
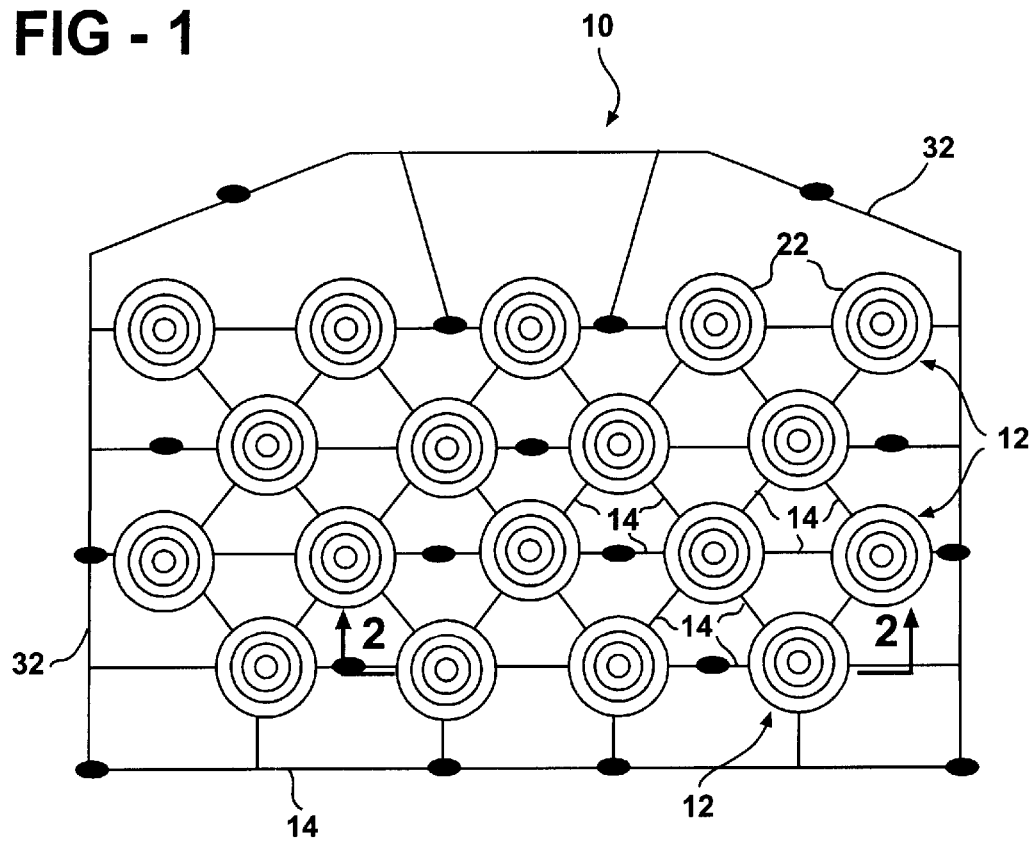
FIG. 1 is a plan view of an assembly constructed in accordance with the subject invention.
Figure 2:
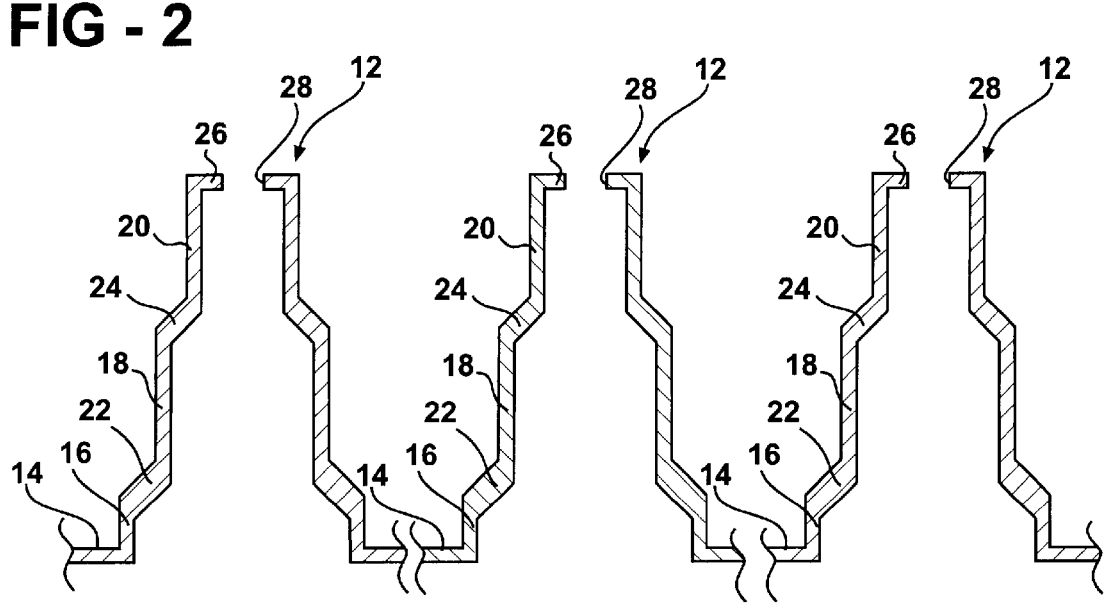
FIG. 2 is an enlarged cross sectional view taken along line 2—2 of FIG. 1.
Figure 3:
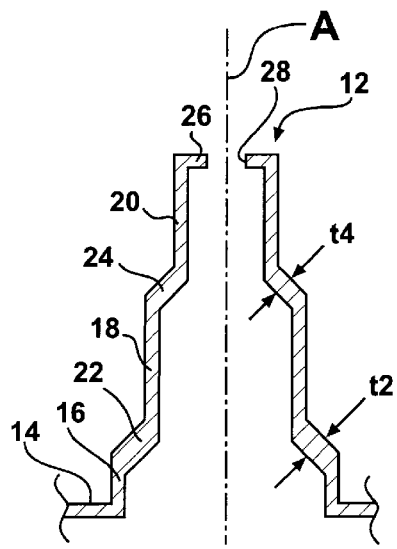
FIG. 3 is yet a further enlarged cross sectional view of the preferred embodiment.
Figure 4:
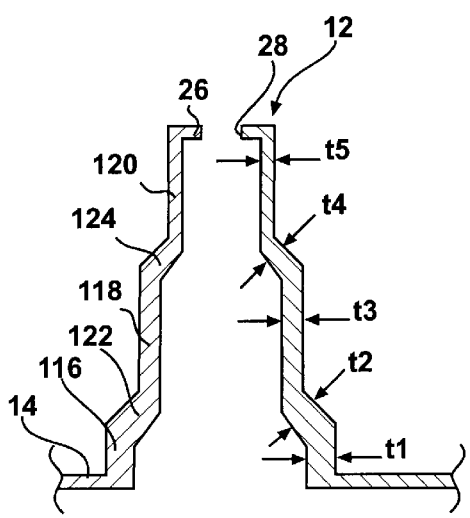
FIG. 4 is a view similar to FIG. 3 but showing an alternative embodiment.
Figure 5:
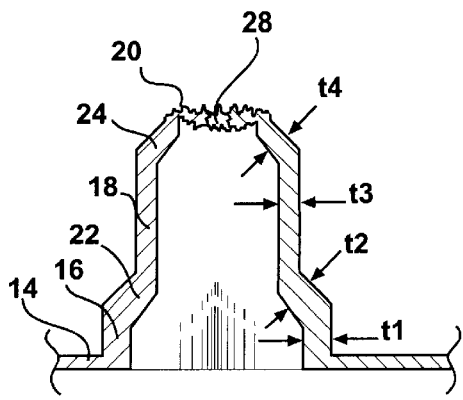
FIG. 5 is a view similar to FIG. 3 but showing a first stage of energy absorption and collapse.
Figure 6:
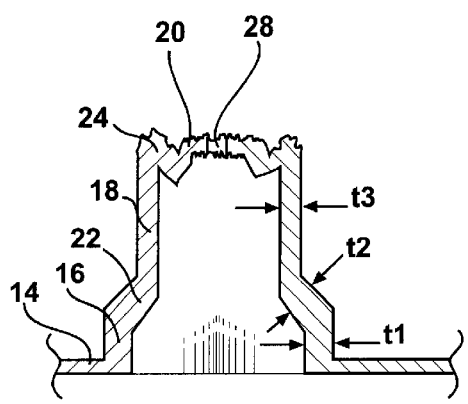
FIG. 6 is a view similar to FIG. 5 but showing the next stage of energy absorption and collapse.
Figure 7:
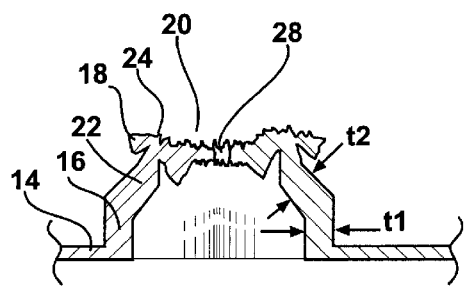
FIG. 7 is similar to FIGS. 5 and 6 but showing yet a further stage of energy absorption and collapse.

Referring to the Figures, wherein like numerals indicate like or corresponding parts throughout the several views, an energy absorption module constructed in accordance with the subject invention is generally shown at 10 in FIG. 1. The module 10 includes a plurality of energy absorption cells, each of which is generally indicated at 12, or in the case of the alternative embodiment of FIG. 4, generally indicated at 112. That is, the like or corresponding parts in the embodiment of FIG. 4 are shown with corresponding numerals in the one hundred series.

A plurality of the cells 12, 112 are interconnected by internal stringers 14, 114. Each cell 12, 112 includes a first wall 16, 116 extending upwardly from the stringers 14, 114 in a cylinder about the axis (A). A second wall 18, 118 extends in a cylinder about an axis (A) within and closer to the axis (A) than the first wall 16, 116. In other words, the second wall 18, 118 defines a cylinder of a smaller radius than the radius defined by the first wall 16, 116. A third wall 20, 120 extends in a cylinder about the axis (A) within and closer to the axis (A) than the second wall 18, 118.

Each cell 12, 112 is characterized by including a first step wall 22 and 122 generally horizontally interconnecting the first 16, 116 and second 18, 118 walls and having a greater thickness than the second wall 18, 118 for assuring collapse of the second wall 18, 118 before collapse the first wall 16, 116 in response to a force applied to the second wall 18, 118. Likewise, a second step wall 24, 124 generally horizontally interconnects the second 18, 118 and third 20, 120 walls and has a greater thickness than the first step wall 22 and 122 for assuring collapse of the third wall 20, 120 before collapse of the second wall 18, 118 in response to a force applied to the third wall 20, 120. As alluded to above, the first 16, 116, second 18, 118 and third 20, 120 walls are annular via right cylinders. On the other hand, the step walls are frustro-conical, i.e., forming part of a cone. Alternatively, the first 16, 116, second 18, 118 and third 20, 120 walls may also have a frusto-conical shape, but at a lesser angle to the axis (A) than the step walls.

A cap 26 closes the third wall 20, 120 above the second step wall 24, 124 and includes a vent hole 28. The diameter of the vent hole 28 can be adjusted for controlling the escape of air from the cell 12, 112 in response to the collapse of the cell 12, 112. The rate of the escape of air from the cell 12, 112 influences the rate of deformation of the cell 12, 112, and can therefore influence the amount of energy absorbed by the shell. Therefore, by adjusting size of the vent hole 28, or even eliminating the cap 26 from the cell 12, 112, the amount of energy absorbed by the cell 12, 112 can in turn be adjusted.

In the cell 112 of the embodiment shown in FIG. 4, the first wall 116 has thickness $t_1$ greater than the thickness $t_2$ of the first step wall 122, while the first step wall 122 has a thickness $t_2$ greater than the thickness $t_3$ of the second wall 118. Continuing, the second wall 118 has a thickness $t_3$ greater than the thickness $t_4$ of the second step wall 124, and the second step wall 124 has a thickness $t_4$ greater than the thickness $t_5$ of the third wall 120. However, the first 16, second 18 and third 20 walls of the first embodiment are of equal thickness. But the first step wall 22 of the first embodiment has a thickness $t_2$ equal to the thickness $t_2$ of the first step wall 122 of the second embodiment and also greater than the thickness $t_4$ of the equal second step walls 24 and 124 of both embodiments.

As illustrated in FIG. 1, a plurality of the cells 12 are interconnected by the cell stringers 14. Six of the stringers 14 extend radially from some of the cells 12, i.e., the cells 12 that are surrounded by other cells 12. A peripheral stringer 32 surrounds a plurality of the cells 12 and the cell stringers 14 to define the energy absorption module 10.

Figure 8:
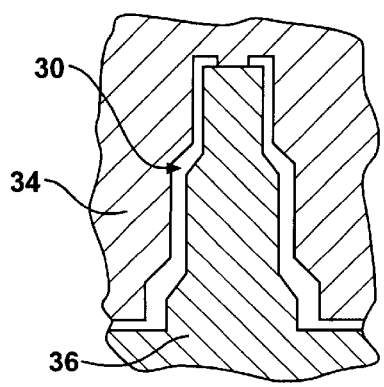
FIG. 8 is a cross sectional view of a mold assembly for injection molding the module.

The invention also includes a method for fabricating the module 10. The method of molding the energy absorption cell 12, 112 comprises the steps of forming a mold cavity, generally indicated at 30 in FIG. 8, between a pair of mating mold parts 34, 36 to define the first wall 16, 116 extending upwardly about an axis (A) and the second wall 18, 118 extending about the axis (A) within and closer to the axis (A) than the first wall 16, 116 and the first step wall 22 and 122 horizontally interconnecting the first 16, 116 and second 18, 118 walls and having a greater thickness than the second wall 18, 118. The method includes the step of injecting organic polymeric, i.e., plastic, material into the cavity 30.

By injection molding the inventive cell 12, 112 a variable cell wall thickness may be achieved in desired locations such as, for example, the step wall 22, 122. While thermo-forming may yield a variable wall thickness due to the stretching processing of the thermo-formed sheet, the location and amount of wall thickness can not be accurately controlled.

In a more specific sense, the cavity 30 is formed to define the third wall 20, 120 extending about the axis (A) within and closer to the axis (A) than the second wall 18, 118, and the second step wall 24 and 124 horizontally interconnecting the second 18, 118 and third 20, 120 walls and having a greater thickness than the first step wall 22 and 122. As alluded to above, the cavity is also formed to define the step walls 22, 24 and 122, 124 as frustro-conical. The cavity 30 is also formed to define the cap 26 closing the third wall 20, 120 above the second step wall 24 and 124, with the vent hole 28 in the cap 26.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An injection molded energy absorbing assembly, comprising: a plurality of interconnected generally parallel spaced tubular cells, each cell having a first tubular wall portion and a second tubular wall portion having a diameter less than said first tubular wall portion integrally connected to said first tubular wall portion by a generally transverse step wall, said second tubular wall portion having a wall thickness less than said first tubular wall portion, whereby said second tubular wall portion collapses under less force than said first tubular wall portion.

2. The injection molded energy absorbing assembly as defined in claim 1, wherein said injection molded assembly includes a third tubular wall portion having a diameter less than said second tubular wall portion integrally joined to said second tubular wall portion by a generally transverse second step wall, whereby said third tubular wall portion collapses under less force than said second tubular wall portion.

3. The injection molded energy absorbing assembly as defined in claim 2, wherein said third tubular wall portion includes an integral end cap portion extending generally transverse to said third tubular wall portion having an opening therethrough.

4. The injection molded energy absorbing assembly as defined in claim 1, wherein said tubular cells are integrally connected by stringers formed during injection molding of said energy absorbing assembly.

5. The injection molded energy absorbing assembly as defined in claim 1, wherein said first and second tubular wall portions are generally cylindrical.

6. An injection molded energy absorbing assembly, comprising: a plurality of spaced integrally connected generally parallel tubular cells, each tubular cell including a first tubular wall portion having a first open end and a second open end, a second tubular wall portion having a diameter less than said first tubular wall portion having a first open end integrally joined to said second open end of said first tubular wall portion by a first generally transverse step wall portion and a second open end, and a third tubular wall portion having a diameter less than said second tubular wall portion including a first open end integrally joined to said second open end of said second tubular wall portion by a generally transverse second step wall portion, said third tubular wall portion having a wall thickness less than said second tubular wall portion and said second tubular wall portion having a wall thickness less than said first tubular wall portion, whereby said third tubular wall portion collapses under less force than said second tubular wall portion and said second tubular wall portion collapses under less force than said first tubular wall portion.

7. The injection molded energy absorbing assembly as defined in claim 6, wherein said second open end of said third tubular wall portion includes an integral generally transverse end cap portion.

8. The injection molded energy absorbing assembly as defined in claim 7, wherein said end cap portion includes an opening therethrough.

9. The injection molded energy absorbing assembly as defined in claim 6, wherein said tubular cells are interconnected in spaced relation by injection molding integral stringers.

10. The injection molded energy absorbing assembly as defined in claim 9, wherein said injection molded stringers are integral with said first tubular wall portions of said tubular cells.

* * * * *